US010552279B2

(12) United States Patent
Gomes

(10) Patent No.: US 10,552,279 B2
(45) Date of Patent: *Feb. 4, 2020

(54) DETECTING AND REPORTING UNINTENDED STATE CHANGES

(71) Applicant: INTERNATIONAL BUSINESS MACHINES CORPORATION, Armonk, NY (US)

(72) Inventor: Louis P. Gomes, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 28 days.

This patent is subject to a terminal disclaimer.

(21) Appl. No.: 15/639,280

(22) Filed: Jun. 30, 2017

(65) Prior Publication Data
US 2019/0004912 A1 Jan. 3, 2019

(51) Int. Cl.
G06F 11/00 (2006.01)
G06F 11/22 (2006.01)
G06F 11/263 (2006.01)

(52) U.S. Cl.
CPC ........ G06F 11/2268 (2013.01); G06F 11/263 (2013.01)

(58) Field of Classification Search
CPC combination set(s) only.
See application file for complete search history.

(56) References Cited

U.S. PATENT DOCUMENTS

| 6,167,479 | A | * | 12/2000 | Hartnett | G06F 9/30065 710/260 |
| 6,715,062 | B1 | * | 3/2004 | Moore | G06F 9/30003 712/227 |
| 8,381,040 | B2 | * | 2/2013 | Almog | G06F 11/3688 712/226 |
| 8,726,086 | B2 | * | 5/2014 | Warren | G06F 11/263 714/28 |
| 9,298,593 | B2 | * | 3/2016 | Sofia | G06F 11/3692 |
| 9,329,922 | B1 | | 5/2016 | McFarlane et al. | |
| 2003/0040897 | A1 | * | 2/2003 | Murphy | G05B 19/042 703/18 |

(Continued)

FOREIGN PATENT DOCUMENTS

JP H0553967 A 3/1993

OTHER PUBLICATIONS

List of IBM Patents or Patent Applications Treated as Related; Date Filed: Jun. 30, 2017, 2 pages.

(Continued)

Primary Examiner — Amine Riad
(74) Attorney, Agent, or Firm — Cantor Colburn LLP; Teddi Maranzano

(57) ABSTRACT

Embodiments of the invention are directed to computer-implemented methods, computer systems, and computer program products for testing hardware. The method includes reading a stream of test instructions. The method further includes determining if test instruction exceptions present in the stream of test instructions. The method further includes inserting an interrupt into the test instruction stream for each determined test instruction exception. The method further includes generating one or more error messages for each determined test instruction exception.

9 Claims, 4 Drawing Sheets

(56) References Cited

U.S. PATENT DOCUMENTS

2012/0317533 A1    12/2012  Zawalski et al.
2013/0031414 A1     1/2013  Dhuse et al.
2015/0131456 A1*    5/2015  Allmendinger ..... H04L 43/0847
                                                         370/242

OTHER PUBLICATIONS

Louis P. Gomes, "Detecting and Reporting Unintended State Changes,"
U.S. Appl. No. 15/805,738, filed Nov. 7, 2017.

* cited by examiner

DETECTING AND REPORTING UNINTENDED STATE CHANGES

BACKGROUND

The present invention generally relates to the field of computing. More specifically, the present invention relates to improving the testing of computer hardware.

It is often desirable to test new hardware such as a new central processing unit prior to the hardware is finalized. The interaction between software and new hardware may be unknown. Testing of random or pseudo-random conditions is a method used to ensure that new hardware operates as intended. Testing may involve both general testing and specific testing. General testing typically does not keep track of any state changes to the hardware, while specific testing does. Some forms of testing involve the creation of random or pseudo-random instructions and conditions. General testing does not have a capability to handle random instructions that change the state of hardware to ensure that the general testing is accurate.

SUMMARY

Embodiments of the present invention are directed to a computer-implemented method for testing hardware. The method includes reading a stream of test instructions. The method further includes determining if test instruction exceptions are present in the stream of test instructions. The method further includes inserting an interrupt into the test instruction stream for each determined test instruction exception. The method further includes generating one or more error messages for each determined test instruction exception.

Embodiments of the present invention are further directed to a computer system for testing software. The computer system includes a memory and a processor system communicatively coupled to the memory. The processor system is configured to perform a method. The method includes reading a stream of test instructions. The method further includes determining if test instruction exceptions present in the stream of test instructions. The method further includes inserting an interrupt into the test instruction stream for each determined test instruction exception. The method further includes generating one or more error messages for each determined test instruction exception.

Embodiments of the present invention are further directed to a computer program product for testing software. The computer program product includes a computer-readable storage medium having program instructions embodied therewith. The program instructions are readable by a processor system to cause the processor system to perform a method. The method includes reading a stream of test instructions. The method further includes determining if test instruction exceptions present in the stream of test instructions. The method further includes inserting an interrupt into the test instruction stream for each determined test instruction exception. The method further includes generating one or more error messages for each determined test instruction exception.

Additional features and advantages are realized through techniques described herein. Other embodiments and aspects are described in detail herein. For a better understanding, refer to the description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
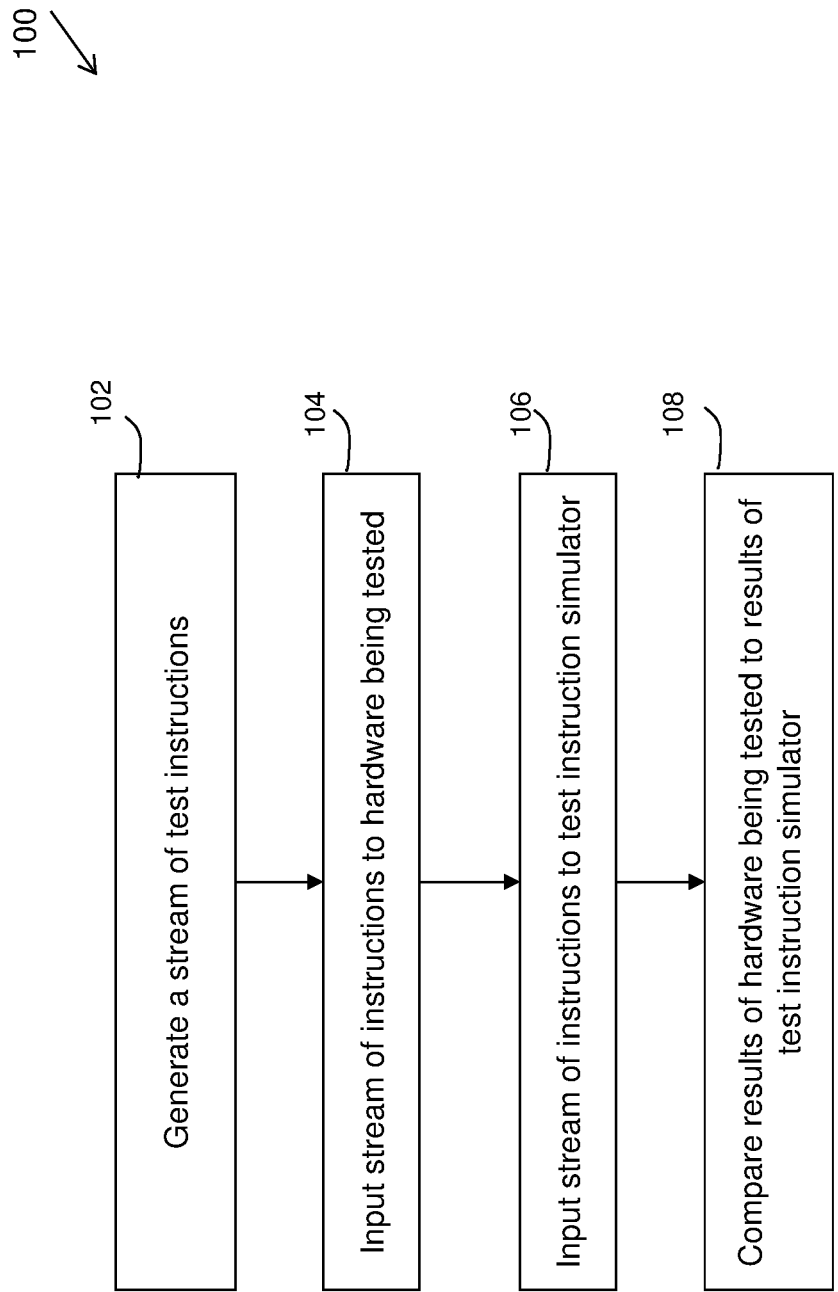
FIG. 1 depicts a flow diagram of an exemplary methodology according to embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the present invention will now be described with reference to the related drawings. Alternate embodiments can be devised without departing from the scope of this invention. Various connections might be set forth between elements in the following description and in the drawings. These connections, unless specified otherwise, can be direct or indirect, and the present description is not intended to be limiting in this respect. Accordingly, a coupling of entities can refer to either a direct or an indirect connection.

Additionally, although a detailed description of a system is presented, configuration and implementation of the teachings recited herein are not limited to a particular type or configuration of device(s). Rather, embodiments are capable of being implemented in conjunction with any other type or configuration of devices and/or environments, now known or later developed.

Furthermore, although a detailed description of usage with specific devices is included herein, implementation of the teachings recited herein are not limited to embodiments described herein. Rather, embodiments are capable of being implemented in conjunction with any other type of electronic device, now known or later developed.

At least the features and combinations of features described in the present application, including the corresponding features and combinations of features depicted in the figures amount to significantly more than implementing a method of testing hardware. Additionally, at least the features and combinations of features described in the immediately following paragraphs, including the corresponding features and combinations of features depicted in the figures go beyond what is well understood, routine and conventional in the relevant field(s).

As described above, testing of new hardware sometimes involves the use of specialized test programs and general test programs. Both types of test programs may utilize the creation of "random test streams" in which random or pseudo-random instructions and data are input to the new hardware to ensure the new hardware is operating in an intended manner.

A flowchart illustrating method 100 is presented in FIG. 1. Method 100 is merely exemplary and is not limited to the embodiments presented herein. Method 100 can be employed in many different embodiments or examples not specifically depicted or described herein. In some embodiments, the procedures, processes, and/or activities of method 100 can be performed in the order presented. In other embodiments, one or more of the procedures, processes, and/or activities of method 100 can be combined or skipped. In one or more embodiments, method 100 is performed by a processor as it is executing instructions.

Method 100 presents a general overview of how testing is performed using the general and specialized test programs. A generator (also known as a test stream generator) is used to generate a stream of test instructions and test values (block 102). The purpose of the stream of test instructions is to test a variety of conditions for the new hardware. Many different combinations of instructions and data are used to determine if the new hardware is operating as intended. The hardware being tested may be an individual component, such as a central processing unit, or the hardware being tested may be a combination of components, such as an expansion card containing a central processing unit, memory, and other associated hardware. The instructions are not necessarily intended to perform any useful functionality, as the instructions might be chosen to ensure that a chosen set of instructions is used to perform the testing. In some embodiments, the order of the instructions can be randomized.

The stream of test instructions and values is input to the hardware being tested (block 104). This can be done in one of a variety of different manners, known in the art. In general, the instructions will execute until an exception occurs.

The same stream of test instructions and values is input to a test instruction simulator (block 106). In some embodiments, the hardware being tested (also known as hardware under test or device under test) is a refinement to an existing piece of hardware. For example, new hardware might be the subject of the testing. The new hardware is to be compatible with an existing processor. Therefore, to test the hardware, one should determine how existing hardware responds to the same stream of test instructions and test values.

The results of the stream of test instructions and values that are input to the hardware are compared to the results from the instruction simulator (block 108). Ideally, the results from both are the same. The instructions should have run for the same amount of time on both the new hardware and on the simulator. Since the same instructions and data were used, the results should be identical. As part of reading the results, an error output reader can be used to determine if any errors have occurred and read any error reports that were generated.

As stated above, in a typical general test program, the execution of the test stream does not terminate until an interruption occurs. This can result in one of several problems. In one exemplary situation, there are ten instructions in a test stream. The hardware under test executes all ten instructions before encountering an exception. However, the test instruction simulator may only execute five instructions before it encounters an exception. Thus, a comparison of results between the hardware under test and the test instruction simulator will have different results because they don't execute the same instructions. A user would have to determine if the test instruction simulator is correct or if the hardware under test is correct. A similar situation occurs if the test instruction simulator executes more instructions than the hardware under test.

Test programs can be broadly divided into two categories: general test programs and specialized test programs. General test programs typically do not keep track of the state of one or more objects that the test instructions operate on. An object that the test instructions operate on can be a peripheral coupled to a bus, such as a graphics card, a cryptographic card, or another expansion card. Therefore, specialized test program(s) are used to test instructions that do change a state of an expansion card or another object they operate on. However, there are times when a specialized test program may not have the capability to test some aspects of the instructions that change the state of one or more objects on which they operate.

For example, testing instruction exceptions, such as interruptions, requires code to setup the handling of interruptions (also known as interrupts). Thus, it can be easier and less costly to have a general test program test all the common instructions conditions that do not require state-change, such as interruption. Then a specialized test program can be used to test other conditions, such as other test instruction exceptions and successful test instructions executions that would actually change the state of one or more objects they operate on.

However, because a general test program typically does not support (in other words, might not recognize) a state-change of some objects, the random test stream generator must ensure that a random instruction is not built that would accidentally change the state of one or more objects on which the instructions are operating. Otherwise, simulation results of subsequent test instructions that also operate on the same object(s) (whose state was changed earlier) would fail because the general test program does not know about the state-change of the object(s).

Thus, in many cases, the original error results (test instructions that actually caused the state-change unintentionally) could be obscured by subsequent test instruction results in the same test stream, since successful execution does not cause an interruption. Even simulation results that note errors of subsequent test instruction that also operates on the same object could be obscured by subsequent test instructions results in the same test stream since successful execution does not cause an interruption.

There are several general cases the test program would detect an error due to unintended state-change caused by a test instruction. A first case is if the failure due to unintended state-change shows up as original error (un-altered state-change results of the instruction that caused the unintended state-change) in the final test stream results of the same test stream at the test stream termination point (due to the state-change results not being covered up by one or more subsequent instructions results). In such a case, one could analyze the error output and find the test instruction that caused the unintended state-change. This is the most simple and straightforward case. In such a case, the simulation results and hardware results would be the same.

A second case can occur when the failure due to unintended state-change shows up as a modified/different error (altered state-change results of a subsequent instruction that detected the unintended state-change) in the final test stream results of the same test stream at the test stream (also known as the termination point). This can be due to the presence of a subsequent test instruction that inspects the state of the object whose state was inadvertently changed earlier in the same test stream. In such a case, the error results of the subsequent test instruction may not have been overwritten by other test instructions further down the line. In such a case, one inspecting the error output would see the error on a subsequent test instruction. For example, the state of the object whose state was changed unintentionally by a test instruction earlier in the same test stream. Thus, the output reader would have to analyze the entire test stream to determine which test instruction caused the failure. This case could take quite some time to find the root cause.

A third case can occur if the failure due to unintended state-change does not show up in the final results of the test stream. This can be due to one of a variety of reasons. For example, the state-change results may be overwritten. In another example, a subsequent test instruction may inspect the state of an object with a changed state. If the state of the object was not intentionally changed, then there may not be any error that is noticeable by checking the error results. Thus, there would not be any error output at the end of the test stream.

As a result, the error caused by the unintended state-change would eventually show up as an error in a subsequent test stream. When testing such as those described in FIG. 1 is performed, if no error is found, then typically another test stream is run. Thus, in the absence of a detected error, there could be many different streams run consecutively before this type of error is detected. There can be a situation where a test instruction would inspect the state of the object during the fifth test stream, but the object's state was changed unintentionally by a test instruction in the first test stream. Because many test streams might have passed since the original test stream where the unintended state-change occurred, the determination of the cause of the error can be difficult to discern.

Since the error output contains information only about the test stream in which the error occurred, the error output reader would not be able to determine what actually happened, using just the error output. In fact, the error output reader may interpret the machine results to be incorrect because the state of that object is not supposed to change in the general test program and did not change in this error test stream. This conclusion would be incorrect, yet an analysis of the error output would not indicate so. It would take many test runs and much debugging efforts to find the test instruction that caused the unintended state-change. Thus, the third case is the most dangerous case of the three.

In addition, there is an issue of the inability to determine if an error is due to an invalid test instruction or if the simulator is operating incorrectly. When an error such as those described occurs, it can be difficult to determine why the results from the simulator do not match the results from the hardware being tested. The error could be due to the hardware being tested or due to the simulator.

Embodiments of the present invention address the above-described issues by using a novel method and system of using an instruction simulator to monitor, detect, and report on any unintended state change caused by instructions in a random test stream.

Figure 2:
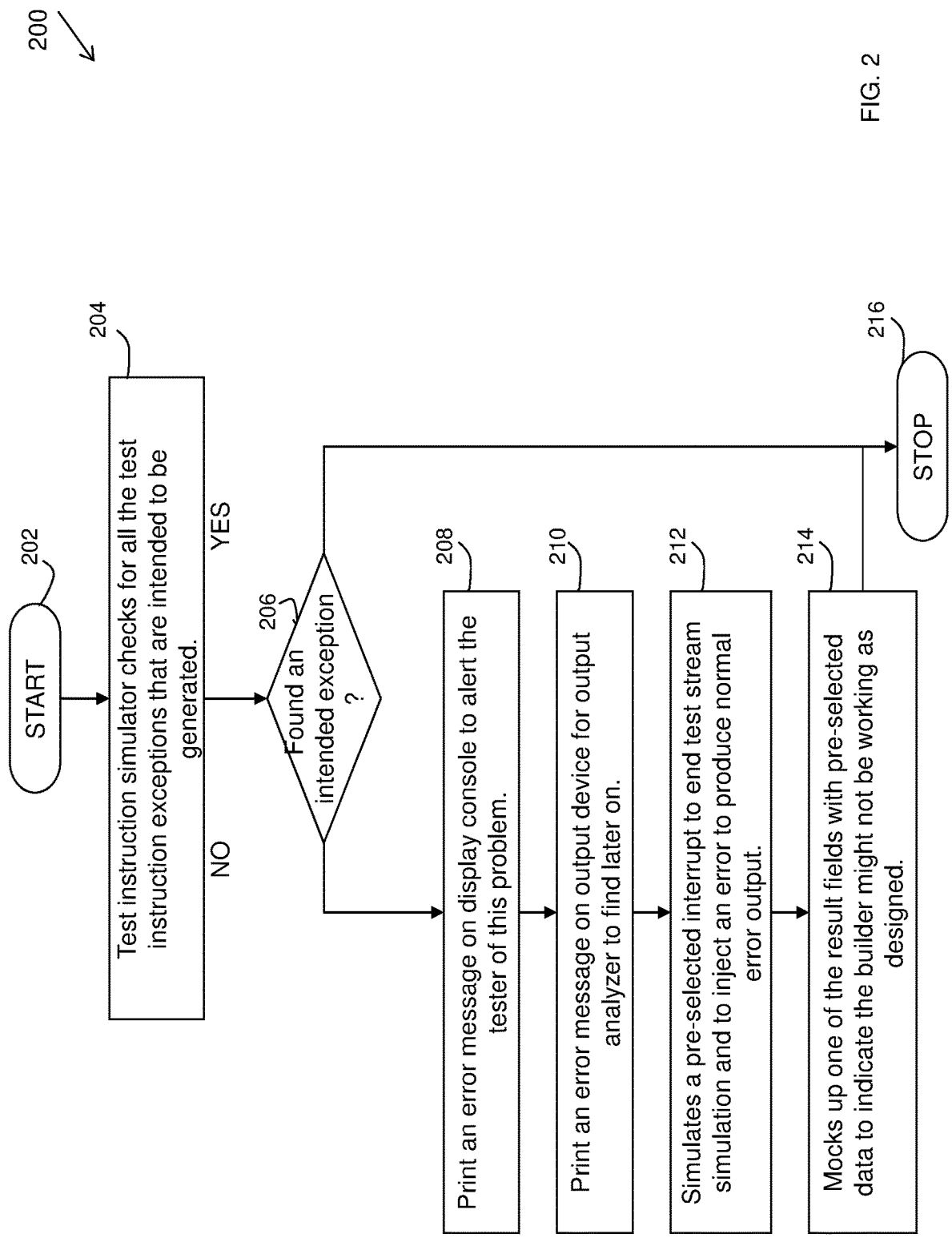
FIG. 2 depicts a flow diagram illustrating a methodology according to embodiments of the invention.

A flowchart illustrating method 200 is presented in FIG. 2. Method 200 is merely exemplary and is not limited to the embodiments presented herein. Method 200 can be employed in many different embodiments or examples not specifically depicted or described herein. In some embodiments, the procedures, processes, and/or activities of method 200 can be performed in the order presented. In other embodiments, one or more of the procedures, processes, and/or activities of method 200 can be combined or skipped. In one or more embodiments, method 200 is performed by a processor as it is executing instructions.

Method 200 illustrates a method used in one or more embodiments. In some embodiments, the actions described herein can be undertaken by a test instruction simulator that is used to compare results when the same test instruction stream is executed by the hardware under test. The test instruction simulator examines the test stream (block 204). In particular, the test instruction simulator determines all test instruction exceptions that will be generated by the test stream. This can be accomplished in a variety of different manners. For example, the architecture states that a privileged operation exception (interrupt code 0002) is recognized if a privileged instruction is issued with P-bit of the PSW (program Status Word) set to one (indicating problem state) where only general (not privileged) instructions are allowed to be executed successfully. If the test stream generator randomly chose to force privileged operation exception (interrupt code 0002), then it would build the PSW with P-bit set to one and insert a privileged instruction like NQAP. The execution of NQAP by the machine should produce privileged operation exception (interrupt code 0002). Thus the NQAP instruction simulator would simulate privileged operation exception (interrupt code 0002) since P-bit of the PSW is set to one.

If no exception is found (block 206), then this particular process ends (block 216) and the test instruction simulator can operate in a traditional manner.

Otherwise, the test instruction simulator generates multiple warnings. In such a situation, it can be assumed that the test stream generator is not working as designed because it failed to generate one of the test instruction exceptions that it was designed to generate. Therefore, the test instruction simulator takes multiple actions to inform the test operator (the person who runs the test stream generator) as well as the error analyzer (the person who analyzes the error reports) that the test stream generator is not working as designed. The problem needs to be analyzed by the test operator or the error analyzer and then fixed by the test program owner if needed. The test instruction simulator also terminates the test stream to make it easier to identify the root cause test instruction and prevent additional errors or masking of the root cause error results by subsequent test instructions of the same test stream.

To be more specific, an error message can be created on a display console (block 208). This error message can be used to alert the test operator of the problem that was detected. An error message can be displayed on an alternative output device (block 210). This error message can be used by an error analyzer at a later point in time. This alternative output device can include a print-out of the details of the error or the creation of a file that contains the details.

A pre-selected interrupt can be placed in the test stream (block 212). Because only an interrupt can end the test stream, adding the interrupt is needed to ensure that the test simulator ceases operation at the selected point of the test stream. This is done to avoid further miscompares by any subsequent test instructions that operate on the same object(s) whose state was just changed by the current test instruction due to incorrect coding of the test instruction builder. Pre-selected data can be inserted into one or more result fields (block 214). This data can be used to indicate that the generator might not be working as intended. The result field can be a unique reply code to identify this specific problem, for example. The pre-selected data indicates that the test stream generator is not working as designed and thus further investigation is necessary to figure out the root cause of the problem.

Further investigation by the test operator may find that either the test stream generator or the simulator is not working as designed. Thus, this type of error detection and reporting method works for finding and correcting problems with either the test stream generator or the test instruction simulator. The error output points directly to the root cause of the problem at the source and helps to eliminate the need to work backward and perform much more analysis and debugging needed to find the test instruction that is the root cause of the error.

While an unintended state change can result in a damaging output and very hard and time consuming to find the root cause of the problem, method 200 can also be used to find similar but less severe test stream generator problems. For example, a state change might not occur, but the test stream generator mistakenly builds a condition that is not part of the design. In an alternative case, the test stream generator mistakenly does not build the intended condition which leads to a condition that is not part of the design. For example, there may be an instruction that can generate ten different conditions, but the test stream generator is designed to build only six of those ten possible conditions. Because the test stream generator generally injects only exception conditions, mistakenly not injecting that exception condition could lead to a condition that is not part of the six conditions the test stream generator is designed to generate.

Figure 3:
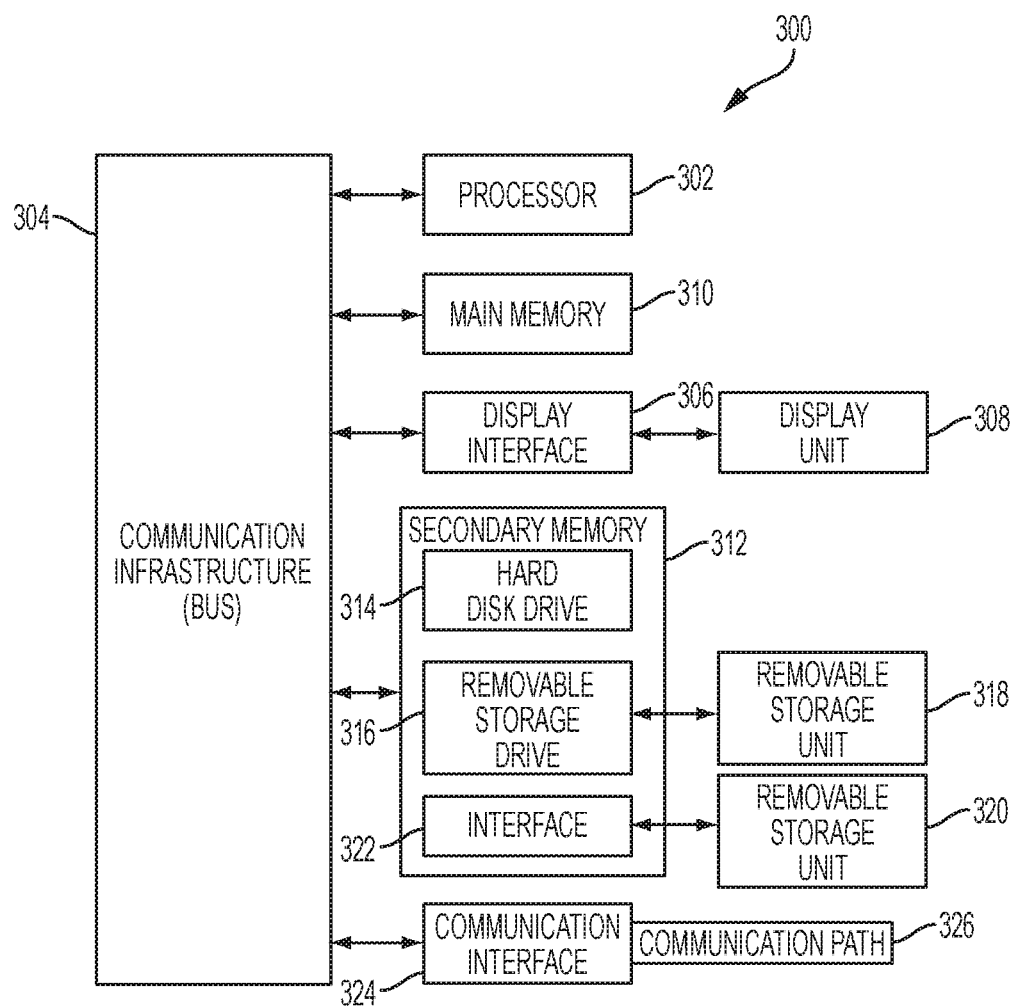
FIG. 3 depicts a computer system capable of implementing hardware components according to embodiments of the invention.

FIG. 3 depicts a high-level block diagram of a computer system 300, which can be used to execute one or more embodiments. More specifically, computer system 300 can be used to implement hardware components of systems capable of performing methods described herein. Although one exemplary computer system 300 is shown, computer system 300 includes a communication path 326, which connects computer system 300 to additional systems (not depicted) and can include one or more wide area networks (WANs) and/or local area networks (LANs) such as the Internet, intranet(s), and/or wireless communication network(s). Computer system 300 and additional system are in communication via communication path 326, e.g., to communicate data between them.

Computer system 300 includes one or more processors, such as processor 302. Processor 302 is connected to a communication infrastructure 304 (e.g., a communications bus, crossover bar, or network). Computer system 300 can include a display interface 306 that forwards graphics, textual content, and other data from communication infrastructure 304 (or from a frame buffer not shown) for display on a display unit 308. Computer system 300 also includes a main memory 310, preferably random access memory (RAM), and can also include a secondary memory 312. Secondary memory 312 can include, for example, a hard disk drive 314 and/or a removable storage drive 316, representing, for example, a floppy disk drive, a magnetic tape drive, or an optical disc drive. Hard disk drive 314 can be in the form of a solid-state drive (SSD), a traditional magnetic disk drive, or a hybrid of the two. There also can be more than one hard disk drive 314 contained within secondary memory 312. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disc, etc. which is read by and written to by removable storage drive 316. As will be appreciated, removable storage unit 318 includes a computer-readable medium having stored therein computer software and/or data.

In alternative embodiments, secondary memory 312 can include other similar means for allowing computer programs or other instructions to be loaded into the computer system. Such means can include, for example, a removable storage unit 320 and an interface 322. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 320 and interfaces 322 which allow software and data to be transferred from the removable storage unit 320 to computer system 300.

Computer system 300 can also include a communications interface 324. Communications interface 324 allows software and data to be transferred between the computer system and external devices. Examples of communications interface 324 can include a modem, a network interface (such as an Ethernet card), a communications port, or a PC card slot and card, a universal serial bus port (USB), and the like. Software and data transferred via communications interface 324 are in the form of signals that can be, for example, electronic, electromagnetic, optical, or other signals capable of being received by communications interface 324. These signals are provided to communications interface 324 via communication path (i.e., channel) 326. Communication path 326 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 310 and secondary memory 312, removable storage drive 316, and a hard disk installed in hard disk drive 314. Computer programs (also called computer control logic) are stored in main memory 310 and/or secondary memory 312. Computer programs also can be received via communications interface 324. Such computer programs, when run, enable the computer system to perform the features discussed herein. In particular, the computer programs, when run, enable processor 302 to perform the features of the computer system. Accordingly, such computer programs represent controllers of the computer system. Thus it can be seen from the forgoing detailed description that one or more embodiments provide technical benefits and advantages.

Figure 4:
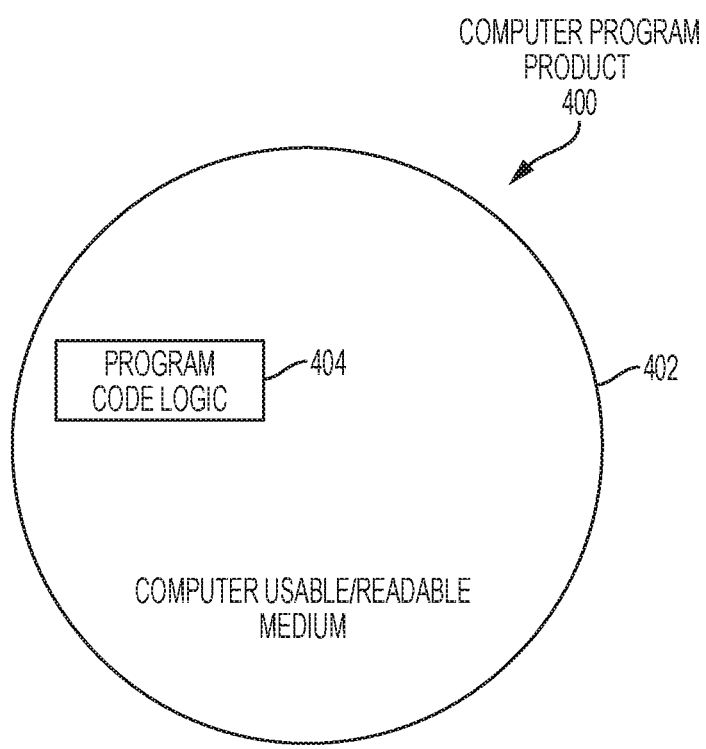
FIG. 4 depicts a diagram of a computer program product according to embodiments of the invention.

Referring now to FIG. 4 a computer program product 400 in accordance with an embodiment that includes a computer-readable storage medium 402 and program instructions 404 is generally shown.

Embodiments can be a system, a method, and/or a computer program product. The computer program product can include a computer-readable storage medium (or media) having computer-readable program instructions thereon for causing a processor to carry out aspects of embodiments of the present invention.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a compact disc read-only memory (CD-ROM), a digital versatile disk (DVD), a Blu-ray disc, a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform embodiments of the present invention.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein includes an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The descriptions presented herein are for purposes of illustration and description, but is not intended to be exhaustive or limited. Many modifications and variations will be apparent to those of ordinary skill in the art without departing from the scope and spirit of embodiments of the invention. The embodiment was chosen and described in order to best explain the principles of operation and the practical application, and to enable others of ordinary skill in the art to understand embodiments of the present invention for various embodiments with various modifications as are suited to the particular use contemplated.

What is claimed is:

1. A computer system for testing hardware, the system comprising:
   a memory; and
   a processor system communicatively coupled to the memory;
   the processor system configured to:
      read a stream of test instructions from a test stream generator;
      determine test instruction exceptions present in the stream of test instructions;
      insert an interrupt into the test instruction stream for each determined test instruction exception, wherein the interrupt includes pre-selected data that indicates that the test stream generator is not working as intended;
      generate one or more error messages for each determined test instruction exception;
      input the stream of test instructions to test the hardware;
      input the stream of test instructions to a test instruction simulator; and
      compare results of the stream of test instructions input to the hardware with results of the stream of test instructions input to the test instruction simulator to determine if the hardware is operating in the same manner as the test instruction simulator.

2. The computer system of claim 1 wherein:
   the one or more error messages are placed in the results of the stream of test instructions input to the hardware; and
   the one or more error messages are placed in the results of the stream of test instructions input to the test instruction simulator.

3. The computer system of claim 1 wherein:
   the one or more error messages comprise are configured to be output on a display.

4. The computer system of claim 1 wherein:
   the one or more error messages comprise are configured to be output to a computer file.

5. The computer system of claim 1 wherein:
   the interrupt is configured to cause the test instruction simulator to cease operation; and
   the interrupt is configured to cause the hardware to cease operation.

6. A computer program product comprising:
   a computer-readable storage medium having program instructions embodied therewith, the program instructions readable by a processor system to cause the processor system to perform a method comprising:
   reading a stream of test instructions from a test stream generator;
   determining test instruction exceptions present in the stream of test instructions;
   inserting an interrupt into the test instruction stream for each determined test instruction exception; and
   generating one or more error messages for each determined test instruction exception wherein the interrupt includes pre-selected data that indicates that the test stream generator is not working as intended;
   inputting the stream of test instructions to test the hardware;
   inputting the stream of test instructions to a test instruction simulator; and
   comparing results of the stream of test instructions input to the hardware with results of the stream of test instructions input to the test instruction simulator to determine if the hardware is operating in the same manner as the test instruction simulator.

7. The computer program product of claim 6 wherein:
   the one or more error messages comprise are configured to be output on a display.

8. The computer program product of claim 6 wherein:
   the one or more error messages comprise are configured to be output to a computer file.

9. The computer program product of claim 6 wherein:
   the interrupt is configured to cause the test instruction simulator to cease operation; and the interrupt is configured to cause the hardware to cease operation.

* * * * *